No. 653,680. Patented July 17, 1900.
C. T. KINGZETT.
FUMIGATING DEVICE.
(Application filed Jan. 11, 1900.)

(No Model.)

Witnesses:
A. M. Parkins.
S. P. Hollingworth.

Inventor:
Charles Thomas Kingzett
by his Attorneys
Baldwin, Davidson & Wight

THE NORRIS PETERS CO., PHOTO-LITHO., WASHINGTON, D. C.

UNITED STATES PATENT OFFICE.

CHARLES THOMAS KINGZETT, OF LONDON, ENGLAND.

FUMIGATING DEVICE.

SPECIFICATION forming part of Letters Patent No. 653,680, dated July 17, 1900.

Application filed January 11, 1900. Serial No. 1,115. (No model.)

*To all whom it may concern:*

Be it known that I, CHARLES THOMAS KINGZETT, a subject of the Queen of Great Britain, residing at Elmstead Knoll, Chislehurst, London, county of Kent, England, have invented certain new and useful Improvements in Fumigators and Disinfectors, of which the following is a specification.

This invention contemplates the combination or association in an improved way with a sulfur fumigating-candle of a holder or receptacle for a charge of another germicide or disinfectant—such, for instance, as formaldehyde or mercuric chlorid, the vapors of which commingle with the sulfurous-acid gas or vapors given off by the sulfur, and also the use in such an organization of a receptacle for water, which being heated by the burning sulfur gives off a watery vapor which, mixing with the other vapors, renders their disinfecting or fumigating action more efficient. Particularly is this true where formaldehyde is employed, as the vapors thereof combine with the water-vapors and are more permanent and more efficiently effect the desired results. I may say that I prefer to employ in my new fumigator formaldehyde either in solution or in the form of a solid.

Figure 1:
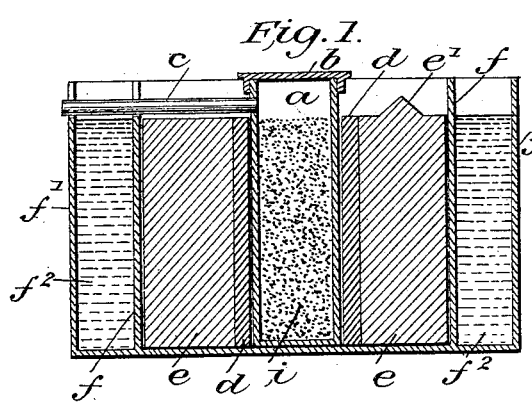
Figure 2:
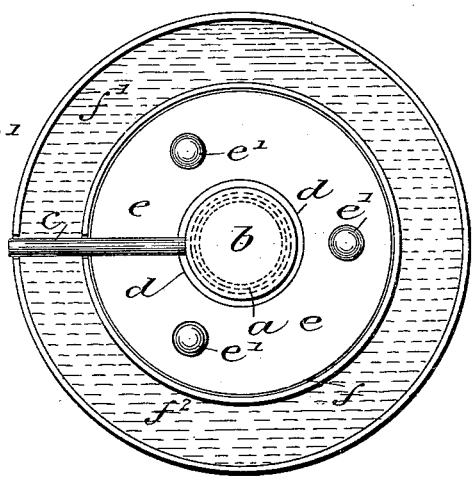
Figure 3:
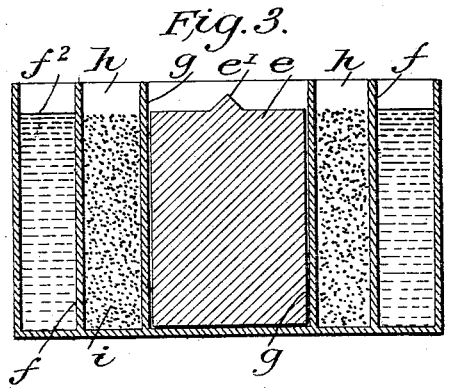
Figure 4:
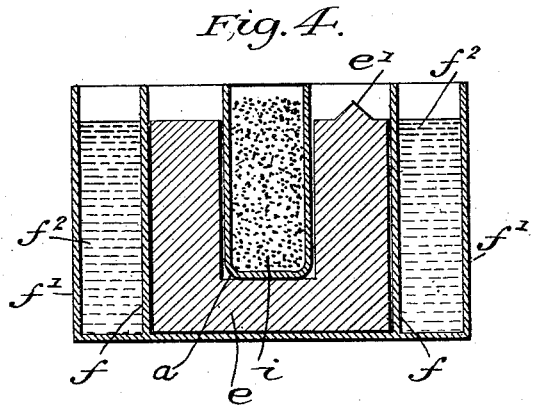

In the accompanying drawings, Figure 1 is a vertical cross-section; Fig. 2, a plan view of one form of apparatus, which is the form that I prefer; Fig. 3, a vertical section through another form of the apparatus or device; Fig. 4, a similar section through still another form of the device.

In Fig. 1, $e$ indicates the mass of sulfur, which may be provided with one or more wicks or igniters $e'$. The sulfur mass is annular in formation and its interior face may be lined with asbestos, plaster-of-paris, or other suitable material $d$ to protect from excessive heat the interior or central holder or vessel $a$, within which is to be placed the formaldehyde or other germicide. The parts thus far described are placed within a vessel having interior and outer walls $f f'$, which are preferably annular and concentric and between which the annular water space or holder $f^2$ exists. The central holder $a$ is provided with a removable cap $b$, from which extends a tube or hollow arm $c$, which terminates over or beyond the water-space $f^2$.

When the sulfur is in a state of ignition, the heat absorbed from the molten or hot mass of sulfur by the holder $a$ and the mercuric chlorid or formaldehyde contained therein causes the volatilization of the contained material; and the gases or vapors therein are discharged above the water-space, where they mix with the water-vapor, which is also drawn off from the water by the heat absorbed from the molten or hot mass of sulfur, with which mixture of vapors the sulfurous-acid vapor also becomes mingled. This general arrangement is of particular importance where formaldehyde is employed, as the vapor thereof is discharged into the rising watery vapor and is prevented from being burned, and the action of the water-vapor is to make more permanent the formaldehyde-vapor and enhance the efficiency of the fumigating or disinfecting action. The moist mixed vapors not only penetrate every crevice, but also deposit or condense upon the surfaces within the space being treated, and thereby bring the fumigating or disinfecting medium into very close and absolute contact therewith. In this form of apparatus a solution of formaldehyde may be used instead of water in the outer annular space $f^2$.

In Fig. 3 the mass of sulfur is surrounded by the wall $g$, which is preferably of metal, and between it and the interior wall $f$ of the envelop or containing vessel is a space $h$, in which the disinfecting material, as formaldehyde or mercuric chlorid, is placed. The action of this device is very much the same as that already described, the three classes of vapors mixing and acting in the way stated.

In Fig. 4 the holder or receptacle for the formaldehyde or mercuric chlorid is seated or sunk in the center of the mass of sulfur. In this case, as in the structure shown in Fig. 1, the centrally-seated holder $a$ may have a cap and a tube or hollow arm discharging over or beyond the water-space $f^2$. In this figure and in Figs. 1 and 3 $i$ indicates the material in the holder.

The solid formaldehyde that may be placed in the holder $a$ may be mixed with some inert material—as plaster-of-paris, asbestos, mineral wool, or kieselguhr—or it may be in the form of pressed cakes or tablets, which may be supplied to the holders as required, and when the material is prepared in this form I may mix with it a sufficient quantity of either wax or plaster-of-paris and water to serve as a binder, and in the latter case to afford the generation of water-vapors in direct association with the formaldehyde-vapor which is generated when used as described.

I consider my invention and the organization, such as hereinbefore described, in which it may be embodied as of particular importance in connection with the use of formaldehyde, although the structures described are adapted to the use of other disinfectant materials—as, for instance, mercuric chlorid and other volatile antiseptic disinfectant or germicide substances, such as camphor and thymol.

The heat for vaporizing the formaldehyde or other antiseptic material, as well as the water being absorbed from the molten or hot mass of sulfur, acts more evenly, and there is no danger of burning or overheating, as might occur if the materials are heated by the flame of the sulfur candle. The device is, moreover, when constructed as described more convenient in shape and satisfactory in use.

I claim as my invention—

1. A fumigator and disinfector comprising a sulfur candle, a water-holder in juxtaposition thereto so that watery vapors may be driven off by the heat absorbed from the hot body of sulfur, and a receptacle for another vaporizable fumigating material contiguous to the sulfur candle so that heat absorbed from the hot body of sulfur may vaporize such material, all three of these elements being so combined and related that the several vapors are commingled.

2. A fumigator and disinfector comprising a sulfur candle, a receptacle embedded in the body thereof for another material, and a water-jacket surrounding the sulfur candle.

3. A fumigator and disinfector comprising a sulfur candle, a receiver for another substance disposed within the mass of sulfur, a layer of protecting material between said holder and the surrounding sulfur and a water-jacket surrounding the sulfur candle.

4. A fumigator and disinfector comprising a sulfur candle, a receiver for another substance disposed within the mass of sulfur, a layer of protecting material between said holder and the surrounding sulfur, a water-jacket surrounding the sulfur candle, and a vapor-discharging tube or hollow arm extending from said holder and discharging adjacent to the water-space.

5. The new article of manufacture herein described being a fumigator and disinfector comprising a sulfur candle, a receiver adapted to contain a charge of formaldehyde located contiguous to the sulfur candle so as to be heated by the heat absorbed therefrom, and a surrounding water-jacket.

In testimony whereof I have hereunto subscribed my name.

CHARLES THOMAS KINGZETT.

Witnesses:
CYRUS DONNISON,
WILLIAM HOLMES.